United States Patent [19]
Leung

[11] Patent Number: 5,913,160
[45] Date of Patent: Jun. 15, 1999

[54] METHOD AND SYSTEM FOR UPDATING REPLICATED DATABASES IN FOREIGN AND HOME TELECOMMUNICATION NETWORK SYSTEMS FOR SUPPORTING GLOBAL MOBILITY OF NETWORK CUSTOMERS

[75] Inventor: Kin K. Leung, Edison, N.J.

[73] Assignee: AT&T Corporation, Middletown, N.J.

[21] Appl. No.: 08/305,004

[22] Filed: Sep. 13, 1994

[51] Int. Cl.$^6$ .................................................. H04Q 7/00
[52] U.S. Cl. ........................................ 455/403; 379/201
[58] Field of Search .......................... 370/110.1; 379/59, 379/60, 113, 211, 237, 201; 455/403

[56] References Cited

U.S. PATENT DOCUMENTS

| | | | |
|---|---|---|---|
| 3,835,260 | 9/1974 | Prescher et al. | 379/237 |
| 4,348,554 | 9/1982 | Asmuth | 379/113 |
| 4,714,996 | 12/1987 | Gladney et al. | |
| 4,901,340 | 2/1990 | Parker et al. | 379/60 |
| 5,185,742 | 2/1993 | Bales et al. | 370/110.1 |
| 5,216,703 | 6/1993 | Roy | 379/201 |
| 5,243,645 | 9/1993 | Bissell et al. | 379/211 |
| 5,280,612 | 1/1994 | Lorie et al. | |
| 5,307,400 | 4/1994 | Sawyer et al. | |
| 5,315,637 | 5/1994 | Breeden et al. | |
| 5,423,068 | 6/1995 | Hecker | |
| 5,781,855 | 7/1998 | Reuhkala et al. | 455/403 |

FOREIGN PATENT DOCUMENTS

| | | | |
|---|---|---|---|
| 0 217 351 | 4/1987 | European Pat. Off. | G06F 15/16 |
| 0 512 962 | 11/1992 | European Pat. Off. | H04Q 7/04 |
| WO 94/04006 | 7/1993 | WIPO | H04Q 7/04 |

OTHER PUBLICATIONS

ETSI, "Recomendations GSM 03.02 Network Architecture" Apr. 12, 1989, Version 3.1.3.

Delory, Treillard, "Security and Saturation Solutions for GSM, " Telephone Engineer and Management, Jan. 16, 1991.

ETSI, "General Description of a GSM PLMN", Jan. 1990.

"The Exclusive–Writer Approach to Updating Replicated Files in Distribution Processing Systems", Chu, W., et al., *Transactions on Computers*, vol. C–34, No. 6, pp. 489–500, Jun. 1985.

"The Second Generation Cellular System", Ghillebaert, B., *International Switching Symposium, Innovations in Swithching Technology*, pp. 734–738, Mar. 15–20, 1987.

"Cellular Mobile Radio As An Intelligent Network Application", Ballard, M., et al., *Electrical Communication*, vol. 63, No. 4, pp. 389–399, 1989.

(List continued on next page.)

*Primary Examiner*—William Cumming

[57] ABSTRACT

A method and system of the present invention updates a replicated database in a foreign telecommunication network system situated in a foreign region and a home country telecommunication network system situated in a home country. The method and system improves call setup time and system availability in a foreign region for customers roaming outside their home country. Customer records are updated in a visitor database contained in a foreign region within the signaling system of foreign telecommunications network. Information concerning the updated database record is transmitted from the visitor database through the signaling network of a home country to a home database which contains the replicated version of the visitor database record in the foreign region. A field is added to the database record corresponding to a version number of the database record so as to identify the record referenced by queries of calls in progress. The home database record at the home country is changed to reflect changes in the visitor database at the foreign region by using the version number sequence while maintaining at all database sites the older version of the database record for query access until after completing the processing of all previous call querying the database record.

27 Claims, 12 Drawing Sheets

OTHER PUBLICATIONS

"Call Delivery To Portable Telephones Away From Home Using The Local Exchange Network", Beller, M., IEEE, pp. 948–953, 1991.

H. Maab, O. Schreyer, and M. Stahl, "Data management for wide–area mobility in private telecommunications networks," Mobile Kommunikation, Sep. 1993, NEU–ULM DE, pp. 535–546.

M. Fujioka, S. Sakai and H. Yagi, "Hierarchical and Distributed Information handling for UPT," IEEE Network, New York, vol. 4, No. 6, Nov. 1990, pp. 50–60.

Thomas, "Data Integrity in Intelligent Networks", Telecommunications, Jan. 1991.

Rabinovich, Lazowska, "Efficient Support for Partial Write Operations in Replicated Databases", Data Engineering, 1994 10th International Conference, Jan. 1994.

METHOD AND SYSTEM FOR UPDATING REPLICATED DATABASES IN FOREIGN AND HOME TELECOMMUNICATION NETWORK SYSTEMS FOR SUPPORTING GLOBAL MOBILITY OF NETWORK CUSTOMERS

This application is related to commonly assigned, copending patent application filed on even date by the same inventor and entitled "A Method And System For Updating Replicated Databases In A Telecommunication Network System."

FIELD OF THE INVENTION

This invention relates to a method and system for updating replicated databases in a foreign and home telecommunication network system to improve call setup time and system availability to support global mobility of network customers in foreign regions.

BACKGROUND OF THE INVENTION

In the increasingly smaller world brought together by telecommunication networks, it is desirable to globalize a telecommunication network without building expensive transport networks in foreign countries. In fact, some countries will not allow domestic United States companies to enter their foreign countries to build such networks. Other expansive proposals for supporting global mobility include using satellites for locating mobile customers throughout the world. This design would be expensive.

No matter what type of global system is used, however, for certain mobile customers, the number of queries and updates corresponding for one record of a database would increase dramatically. Thus, it would be advantageous to distribute and replicate customer records in multiple geographical locations, i.e., sites, of various signaling networks of foreign countries for easy access, achieving a high level of efficiency and system availability as well as improved call setup time.

SUMMARY OF THE INVENTION

The features and advantages of the present invention overcome the drawback of building expensive call transport systems in foreign countries. The system can be used with both wireless and wired networks of foreign countries.

In accordance with the present invention, a method and system for updating replicated databases in foreign and home telecommunication network systems to improve call setup time and system availability in a foreign region for roaming home network customers is disclosed. A foreign region has a call transport system and switches for forwarding calls from a telecommunication station through the call transport system to a destination. A signaling system is operatively connected to the call transport system and includes a visitor database within the signaling system containing customer records for call routing and other signaling functions.

A home signaling system of a home country has a home database. The visitor database is connected to the home signaling system. A customer record is updated in the visitor database. Information concerning the updated database record is transmitted through the home signaling network to the home database containing the previous version of the database record. Means is responsive to the completion of all calls querying the previous version of both the visitor and home database record for deleting the previous version of the database record.

Queries are launched to the home database when calls are originated from the home country to network customers in the foreign region. Queries are launched to the visitor database when calls originate from the foreign region to a network customer. In one aspect of the invention, current location information in the visitor database is maintained for highly mobile customers traveling in a foreign region. Identifiers contained within the home database directing calls to the visitor database for queries. The use of identifiers contained in the home database lessens the amount of constant updating to the home database.

The record updating activity is recorded after an updated database record has been processed at the visitor or home databases. An acknowledgement is sent from the home database back to the visitor database after an updated database record has been processed within the home database.

Multiple versions of customer records can be maintained in the visitor and home databases so that queries for a call could access the same version of the associated record for consistent routing and signaling information. Each updated record may include a version number of the record so as to identify the record referenced by queries of calls in progress. Records in the home database are updated by the version number sequence of the updated database records. Each version of a record includes a call counter field for indicating the number of ongoing calls whose queries have previously accessed that version of the record. The call counter field is incremented if a new call references to it and decrements the call counter field when a call setup is completed. The previous version of the database record is deleted when the call counter is zero.

BRIEF DESCRIPTION OF THE DRAWINGS

The foregoing features and advantages of the present invention will be appreciated more fully from the following description, with reference to the accompanying drawings in which.

DETAILED DESCRIPTION OF THE INVENTION

The present invention now allows replicated databases to be updated in a telecommunication network system to improve cost setup time and system availability without the overhead typically associated with such concurrency control protocols as primary-site locking and basic time-stamp protocols.

In accordance with the present invention, a customer record is updated in a primary site database within the signaling system of a telecommunication network, which includes a call transport system with switches for forwarding calls from a local telephone station through the call transport system to a destination. The information concerning the updated database record is transmitted through the signaling network to at least one secondary site database which contains the previous replicated version of the primary site database record. The customer record is changed at the secondary site to reflect changes in the database at the primary site. The older versions of the record are maintained at both primary and secondary site databases for query access until after completing the processing of all previous calls querying the versions of the record at the database site.

The replicated database design in accordance with the present invention can also be used to support global mobility. It can be applied to Universal Personal Telecommunications, Personal Communication Services (wired and wireless) and future global mobility services offered by Intelligent Networks. The design will provide a significant saving in transmission facility and operating costs, and minimize delays associated with call setup time. There is a shorter implementation time because the design with global implementation is based on current network infrastructure, requiring deployment of only a small amount of equipment. The design is also consistent with existing protocol standards.

The proposed design for global mobility divides the world (besides the U.S.) into several regions typically covering several countries. To support global mobility, a single or multiple of home databases are installed in the U.S. and a visitor database is installed in each region. A record of signaling data of each customer is stored in the home database. If a customer is visiting a foreign country, the customer record is also replicated in the visitor database of the visited region. Calls for the roaming customer originated from the U.S. and the visited region can be processed by the home and visitor database respectively. Because of local availability of signaling information in the visited region, this design can reduce transmission facilities and operating cost. Call setup time and response time of other signaling functions are also lowered.

Figure 1:
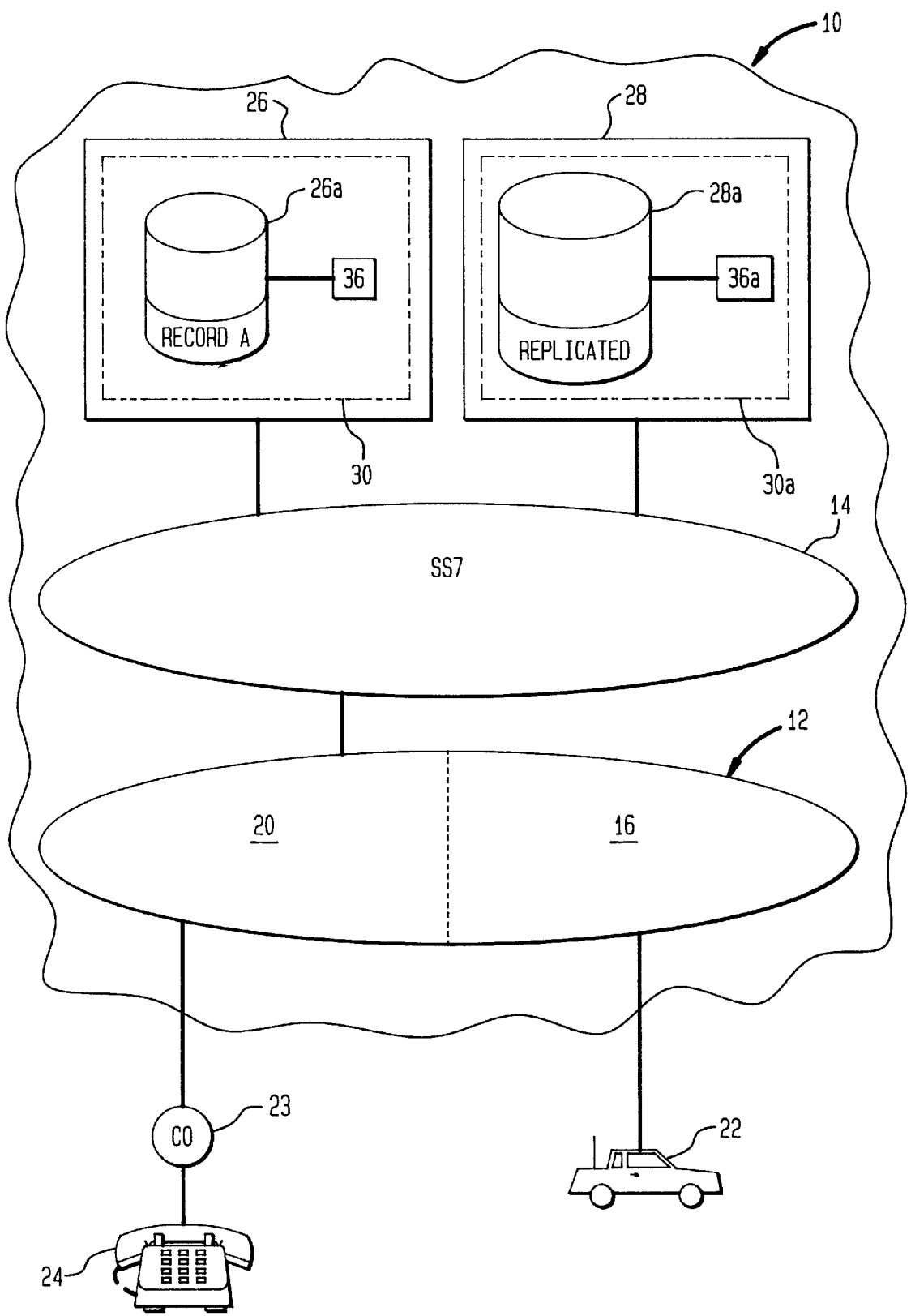
FIG. 1 is a block diagram of an illustrative embodiment of the invention showing, a telecommunication service using the method and system of the present invention in a wired and wireless network.

FIG. 1 illustrates an intelligent network, shown generally at 10, having a transport network, indicated generally at 12, and signaling network such as the common SS7 network 14. The transport network 12 includes a wired network 20, and could include a wireless network 16 for mobile units 22. The transport network 12 connects to the local central office 23 and the local telephone station 24.

The signaling network includes at least a primary site 26, which contains database records for routing purposes and other signaling functions. A secondary site 28 is geographically spaced from the primary site 26 and includes replicated database records from the primary site 26, such as the illustrated Record A corresponding to general routing and signaling information for a customer.

For purposes of understanding, a general overall description of the system basics is set forth, followed by more detailed specifics.

Since the distributed database issues are common to the PCN, the UPT services, and possibly other services involved in the use of databases (e.g., Network Control Points, NCPs) in the IN, the general terminology for distributed database systems is adopted in the following specification. The computer system 30, 30a for respective primary and secondary sites where parts of the database are located is referred to hereafter as sites. Customer records for call routing, features, service profiles, and other signaling information are called records. Reads and writes to the database are also referred to as queries and updates, respectively. To enable recovery from system failures (except disk crashes), each site keeps a log (also known as journal) of all updates made to the local database in a stable memory 36, 36a which can survive the failures.

In accordance with the present invention used with telecommunication services, the database 26a consists of a collection of individual records, which are distributed and replicated at multiple sites, such as the secondary site database 28a. Queries associated with a call, and updates for a customer, access a particular record in the database. Thus, the readset and writeset of a query and an update are one record. As a result, if queries and updates are processed atomically, unnecessary data inconsistency can be avoided.

Furthermore, several queries may be launched to access the associated record during the call setup time, which typically lasts several seconds. Although the record may have been updated in the meantime, it is advantageous not to immediately remove an obsolete copy of the record so that subsequent queries of the calls in progress can be processed in a consistent way according to the previous record. This eliminates the need for locking records for query processing without being concerned about data inconsistency. Additionally, calls will not be mishandled while the customer's record is updated. This would be more difficult if the readset and writeset of queries and updates consisted of many records and files, as in the database systems of other applications.

Because the readset and writeset consist of one record, it is advantageous to treat records as the "unit" for distribution and replication at different sites.

Since the readset (or writeset) of each query (or update) is one record, the concurrency control protocol must only maintain the internal and mutual consistency at the record level. With internal consistency, data items in each record at every site are always consistent. For example, the routing data in a record must be valid so that calls can be routed properly. Mutual consistency is preserved, if copies of a record replicated at different sites become identical in a finite amount of time after a number of updates have been posted to the record. The commitment protocol is designed to enable the system to recover from system failures, i.e., those updates that have been committed will not be undone. As illustrated below, the present invention provides a single protocol which performs the concurrency control and the commitment functions.

The telecommunications system of the invention has basic operating parameters:

a. All sites are connected by a signaling network and messages sent from one site to another may be lost in the network. Even if messages reach their destination sites, they may not necessarily arrive in the order in which they are sent.

b. Records of the database 26a are distributed and replicated at the sites. For example, a record (record A) is replicated at N sites, indexed by $i=1,2,\ldots,N$. To take advantage of load balancing, the initial queries of calls requiring access to record A are sent to those N sites according to some call distribution algorithm known to those skilled in the art, such as the generalized round-robin algorithm, or a static scheme. To avoid unnecessary data inconsistency if a call setup involves multiple queries to the same record, subsequent queries of a call are routed to the same site where the initial query of the call is processed.

c. Each site 26, 28 can keep multiple versions of a record so that queries for a call can access the same version of the associated record for consistent routing and other signaling information. An obsolete version of the record is deleted after the process of all calls querying it has been completed.

d. For recovery purposes, each site records the update activities in a log in stable storage, which can survive the system failures considered in this invention.

For each record A, one site with a copy of the record is selected as its primary site (PS) 26 and all other sites having a copy of the same record are referred to as the secondary sites (SS)28. (Note that the PS can also serve as the PS for many other records stored at this site. For simple implementations, this is likely the case.) Queries for record A are routed to the Primary Site 26 or any of the Secondary Sites 28 according to the call distribution algorithm in use.

However, all updates for record A are first submitted to and processed by the primary site 26. If the processing of an update is completed without causing data inconsistency, the update is completed at the primary site. Then, the information relating to the update is sent from the primary site 26 to all secondary site to update all replicated copies of the original database record. This concurrency control and commitment protocol is referred to as the Primary-Writer Protocol (PWP).

To ensure the correct operations of the protocol, two fields are added to each record: 1) a version number (VN) and 2) a call counter (CC). The version number is used to identify the version of a record referenced by queries of calls in progress, while the call counter indicates the number of ongoing calls, that have previously accessed that version of the record. If the call counter is zero, and the record has been updated, the older version of the record is deleted. At any given time, there are probably very few (e.g., two) versions of the same record existing at a site because all setup time lasts only a few seconds and inter-update time is typically much longer than that.

For purposes of understanding the details of the present invention, the following notations apply. $R_A(n)$ is the version of record A with the version number (VN) being n for $n=0,1,2,\ldots$, and call counter, $CC(n)$ denoting the CC of $R_A(n)$. Assume that $R_A(0)$ initially exists in the system. Further, let v_late be the VN of the latest version of record A existing at a site. $U_n$ denotes an update to record A, which successfully creates $R_A(n)$. The primary-write protocol of the present invention can be further described as follows.

If the query for record A is the first query of a call, then

```
begin
    Access R_A(vn_late); (*Access to the latest
    version of record A at the site*)
    Record the VN, vn_late, for the call;
    CC(vn_late) ← CC(vn_late)+1
end
else begin
    Access R_A(n) that has been accessed by previous
```

-continued

```
    queries of the call;
    If the query is the last one of the call, then
begin
    CC(n) ← CC(n)-1;
    If CC(n)=0 and vn_late>n, then R_A(n) is deleted
end
end
```

The site is assumed to be capable of making the determination whether the query is the last one of the call. If the site does not have this capability, it is assumed that the site is notified by a separate message upon completion of a call processing. In this case, the following operations are performed when such a message is received:

```
CC(n) ← CC(n) -1, and
    if CC(n) = o and vn_late >n, then R_A (n) is deleted.
```

Checking if $CC(n)<0$ prior to the operation of $CC(n) \leftarrow CC(n)-1$ can serve as a sanity check since $CC(n)>0$ by definition.

Details of processing an update for record A at the PS are as follows:
If the update does not cause data inconsistency (e.g., due to incomplete routing data supplied by customers), then

```
begin       (*Update committed*)
            Create R_A(vn_late+1) and set vn_late ← vn_late+1;
            Record the committed update, U_{vn_late}, in the log;
            If CC(vn_late-1)=0, delete R_A(vn_late-1);
            Send an update message, (U_{vn_late}, vn_late), to
            all secondary site's;
            Start a timeout period for the update U_{vn_late}
        end
else begin  (*Update aborted*)
            Abort the update and inform the source
        end
```

Details of processing an update for record A at a secondary site i are as follows.
For an update message $(U_n,n)$, compare n with vn_late at the site; If n>vn_late+1 then

```
begin       (*Updates arrive out of sequence*)
            Add the out-of-sequence update (U_n,n) to a
            update list for record A, sorted in the
            ascending order of VN's for future processing
        end
else if n = vn_late+1 then
    begin   (*Update with the correct VN*)
            Process U_N, create R_A(n), and set vn_late ←
            vn_late 1+1;
            Record the committed update, U_{vn_late}, in the
            log;
            If CC(vn_late-1)=0, delete R_A(vn_late-1);
            Send an acknowledgement with the VN vn_late
            and the site number i to the PS;
            Repeat this procedure to process the first
            update in the update list for record A if its
            VN equals vn_late+1
        end
else if n<vn_late then
    begin           (*Duplicated update which has been previously
                    processed*)
            Send an acknowledgement with the VN n and site
            number i to the PS
        end
```

Details of acknowledgement processing for Record A at the PS are as follows.

If the acknowledgement has been received before, it is discarded; otherwise, the acknowledgement for update $U_n$ from site i is recorded in the log; if all acknowledgements associated with $U_n$ have been received from all secondary sites 28, the timeout is deactivated and a "completion" message is sent to inform the source that all copies of record A have been updated successfully. Processing at Timeout Expiration for Record A at the PS is as follows:

The update $U_n$ is resent to those sites from which the associated acknowledgements have not been received.

As noted before, all updates for record A are first processed by the primary sites 26. If an update causes any data inconsistency, it will be rejected (aborted) by the primary site 26; otherwise, the update is committed. The protocol of the present invention also preserves the internal consistency for all replicated copies of record A.

I. If the copies of $R_A(0)$ replicated at the primary site 26 and all secondary sites 28 are identical and internally consistent, the protocol of the present invention maintains the internal consistency for all replicated copies of record A.

For example, consider a set of updates $(U_n; n=1,2,3, \ldots )$ committed at the PS where $U_n$ maps $R_A(n-1)$ to $R_A(n)$. The mapping is denoted by $R_A(n)=U_n(R_A(n-1))$. Because $R_A(0)$ is consistent and the $U_n$'s are committed by the PS only if they cause no inconsistency, the $R_A(n)=U_n(U_{n-1}(\ldots U_1(R_A(0))\ldots))$ for all $n=1,2,3,\ldots$ is always internally consistent at the primary site 26. By use of the VN's, the protocol forces the $U_n$'s to be posted at each secondary site 28 in the same sequence in which they are committed by the primary site 26. Therefore, the internal consistency at the primary site 26 implies internal consistency for record A at all secondary sites 28.

The mechanism by which the protocol of the present invention maintains record consistency is similar to that for an exclusive-writer protocol proposed in W. W. Chu and J. Hellerstein, "The Exclusive-Writer Approach To Updating Replicated File in Distributed Processing Systems," *IEEE Transactions on Computers*, Volume C-34, No. 6, June 1985, pp. 489–500, although the latter protocol does not consider the delayed processing of out-of-order update messages, the failure recovery aspects and the characteristics of telecommunication applications. It should be noted that, once an update is committed by the primary site 26, it can always be committed at the secondary sites 28. Thus, there is no need for database rollback.

The method and system of the present invention also provides mutual consistency. If no additional updates are submitted to the system after a number of updates for record A have been sent to the primary site 26, all replicated copies of record A at the sites will eventually become identical in a finite time period, provided that all sites are operational, perhaps after a failure for a finite amount of time.

II. If the copies of $R_A(0)$ replicated at the primary site and all secondary sites are identical, the protocol of the present invention maintains the mutual consistency for all replicated copies of record A.

Suppose that updates $(U_n; n=1,2, \ldots ,M)$ have been committed by the primary site and no further updates will be submitted. The use of VN's by the system and the method of the present invention forces the updates $U_n$'s to be posted at all secondary sites in the sequence in which they are committed at the primary site. Since $R_A(0)$ is identical at all sites, copies of $R_A(M)$, which equals $U_M(U_{M-1}(\ldots U_1(R_A(0))\ldots))$, at all sites are identical after updates $(U_n; n=1,2,\ldots ,M)$ are processed by all sites.

The system allows non-identical copies of records replicated at different sites to be available for call processing simultaneously. Thus, queries may access the obsolete information at some secondary sites while updates are pending for processing, thus causing call misroutes. As discussed before, if the probability of such occurrence is satisfactorily small, exclusive access to the records during updates is not needed. Without exclusive access, the system 10 is deadlock free.

Furthermore, the system 10 does not require extensive message exchanges among sites which would otherwise be needed for concurrency control protocols such as locking to provide the exclusive access. Because a record is replicated at N sites, the total number of messages exchanged between the primary site and the secondary sites for each update is $2(N-1)$ at normal situations. This is the minimum number of message exchanges to support the degree of mutual and internal consistency needed for call routing and signaling. The system and method of the present invention can also be used in other applications as long as they can tolerate the record inconsistency, and the probability of referencing obsolete data is kept at an acceptable level.

The system of the present invention also has recovery ability, such as for the following situations.

a. Loss of Messages and Link Failures: A loss of update and acknowledgement messages will cause the timeout to expire on the primary site. When this happens, the primary site resends the update message to the sites associated with the lost messages.

b. Site Failures: If the primary site fails before an update is committed in the log, the update is simply lost. The source discovers that if it does not receive a completion message from the primary site after a certain time period. In case the primary site fails after a committed update has been written in the log, the primary site can resume its operations after the failure as if the update was just written in the log.

As a result, the update is sent to all secondary sites again. For those secondary sites which have already posted the update successfully, they simply discard the duplicated update and send an acknowledgement back to the primary site. If a secondary site fails, the primary site resends the update, if any, to the failed site when the timeout associated with the update expires. After resending the update to a secondary site for a number of times, the primary site may declare the secondary site no longer accessible. In this case, other recovery procedures may be taken when the secondary sites resume operations. When the failed secondary site recovers, it can also resume its operations as if the last update was just written in the log and request the PS to resend all those updates completed during the failure.

Figure 3:
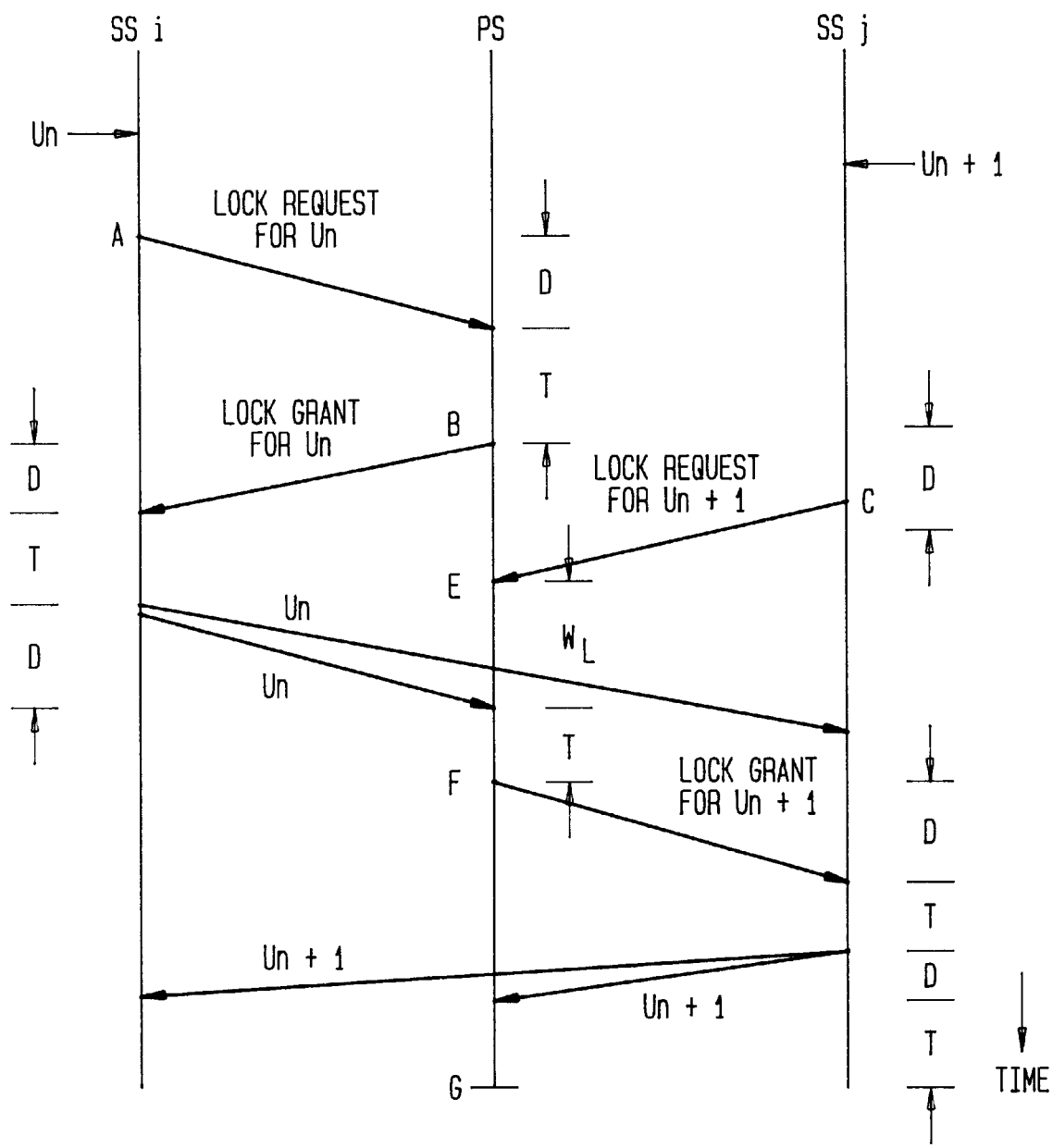
FIG. 3 is a timing diagram for a primary-site locking protocol.
Figure 4:
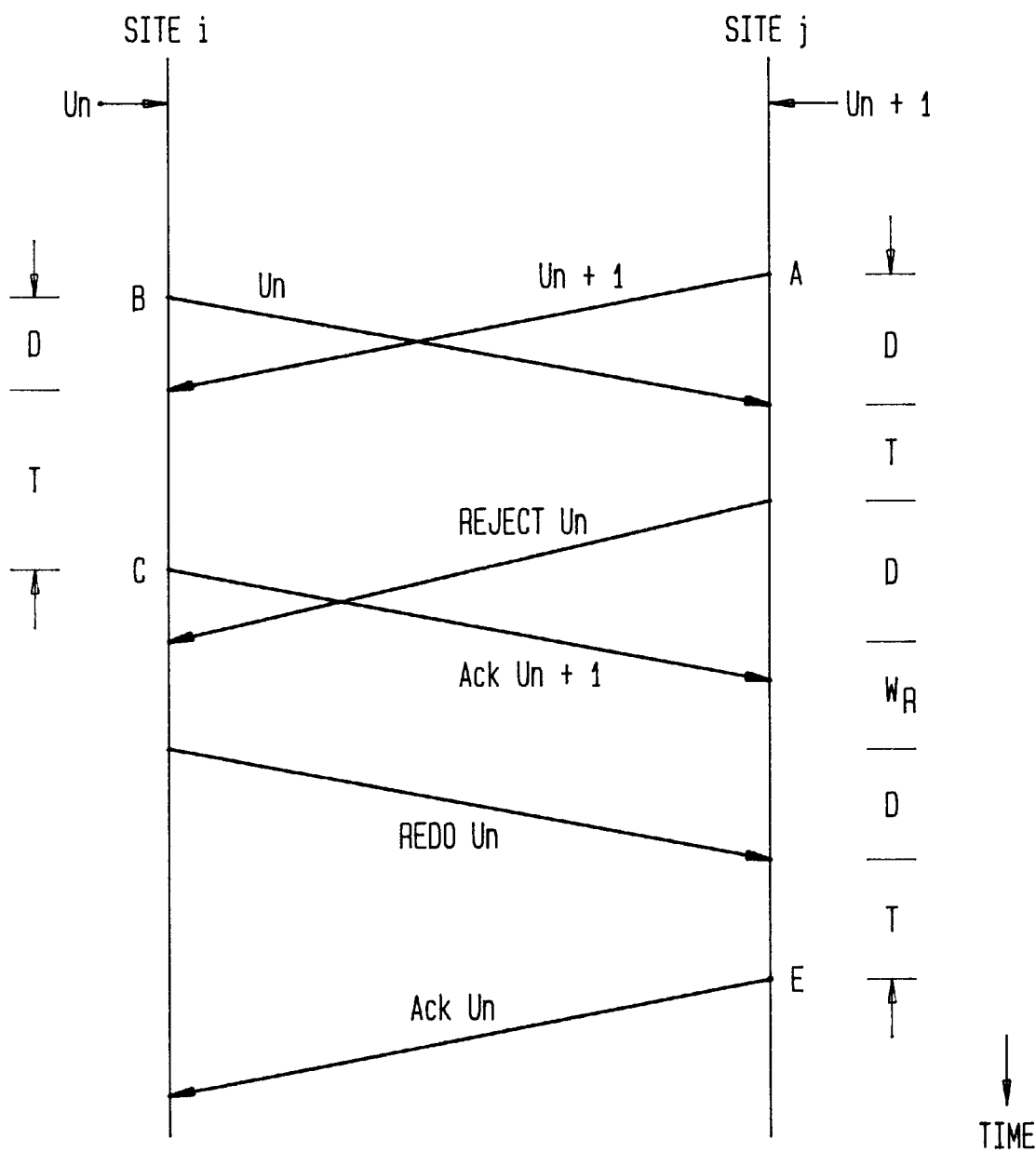
FIG. 4 is a timing diagram for a basic time-stamp protocol.
Figure 5:
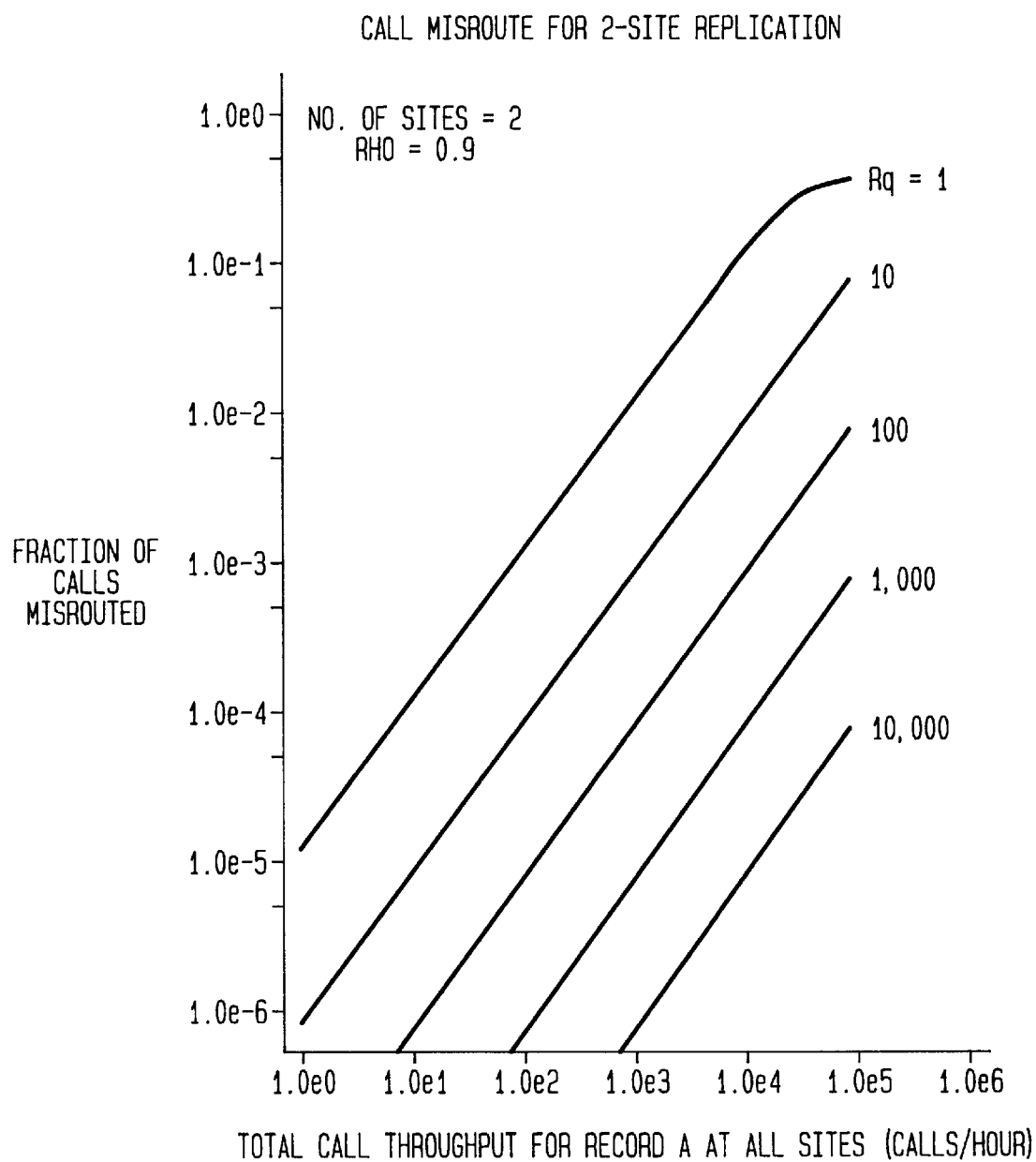
FIG. 5 is a graph showing a call misroute for a two-site replication in accordance with the present invention.
Figure 6:
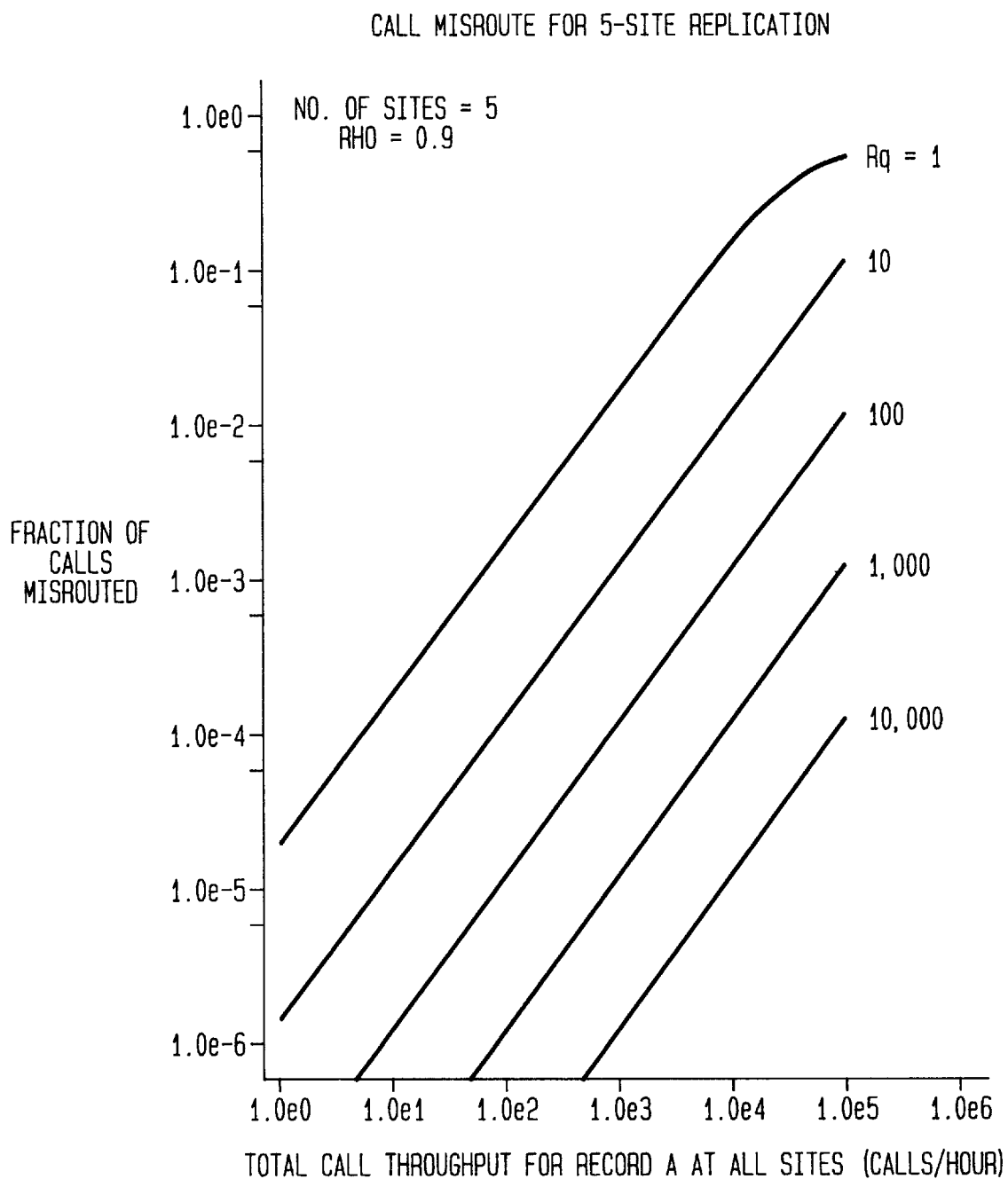
FIG. 6 is a graph showing a call misroute for a five-site replication in accordance with the present invention.
Figure 7:
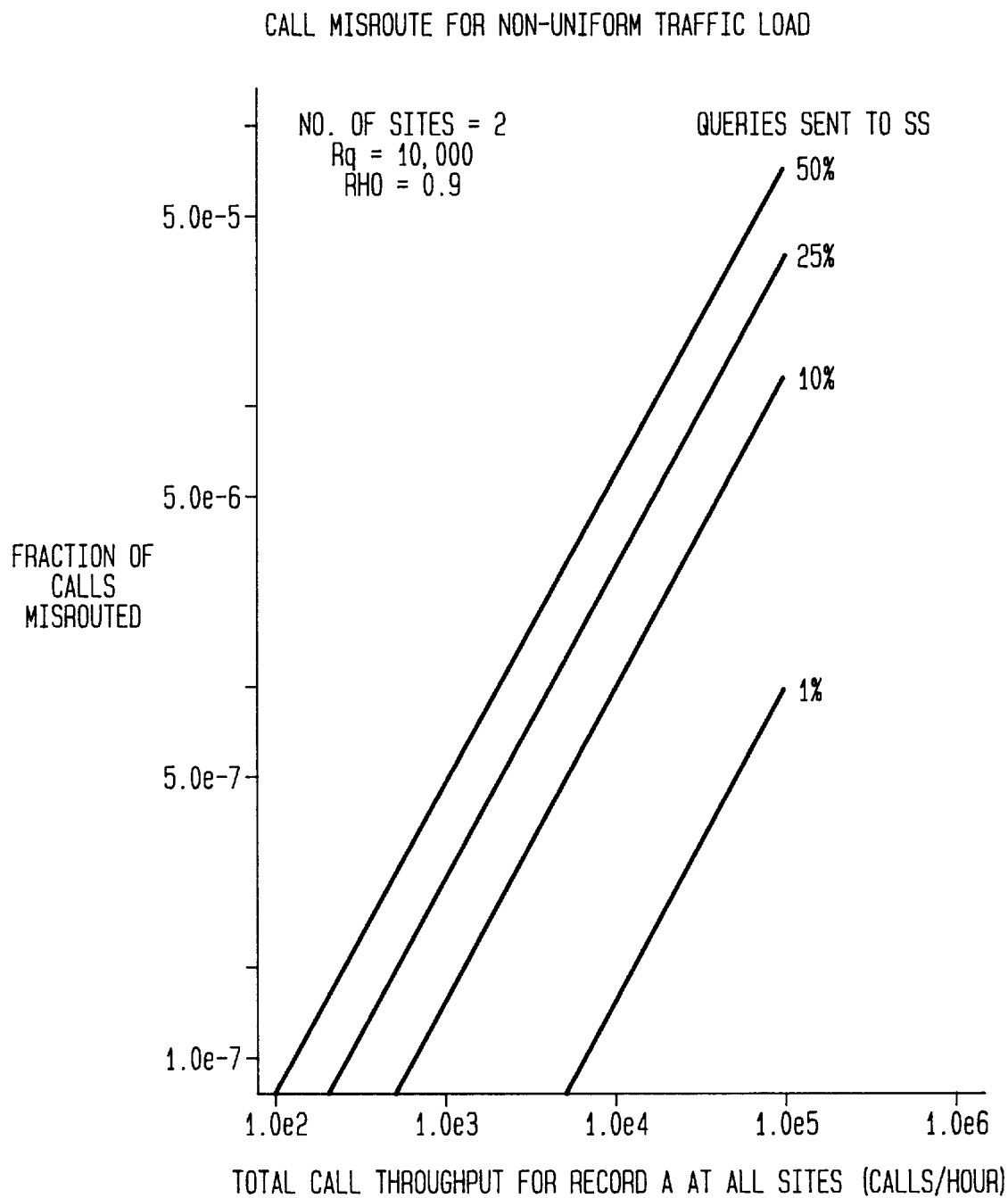
FIG. 7 is a graph showing a call misroute for non-uniform traffic load in accordance with the present invention.

The system and method of the present invention is compared with two commonly used protocols: the Primary-Site Locking (PSL) (FIG. 3) and the Basic Time-Stamp (BTS) protocols (FIG. 4). In addition, several numerical examples are presented to portray the typical performance characteristics of the system of the present invention (FIGS. 5–7).

A fraction of calls may be misrouted by the method of the present invention because of accessing obsolete information at some secondary site databases, while updates are pending. The fraction of calls misrouted is a key performance measure for determining whether or not the method of the present invention is applicable to a particular application.

Figure 2:
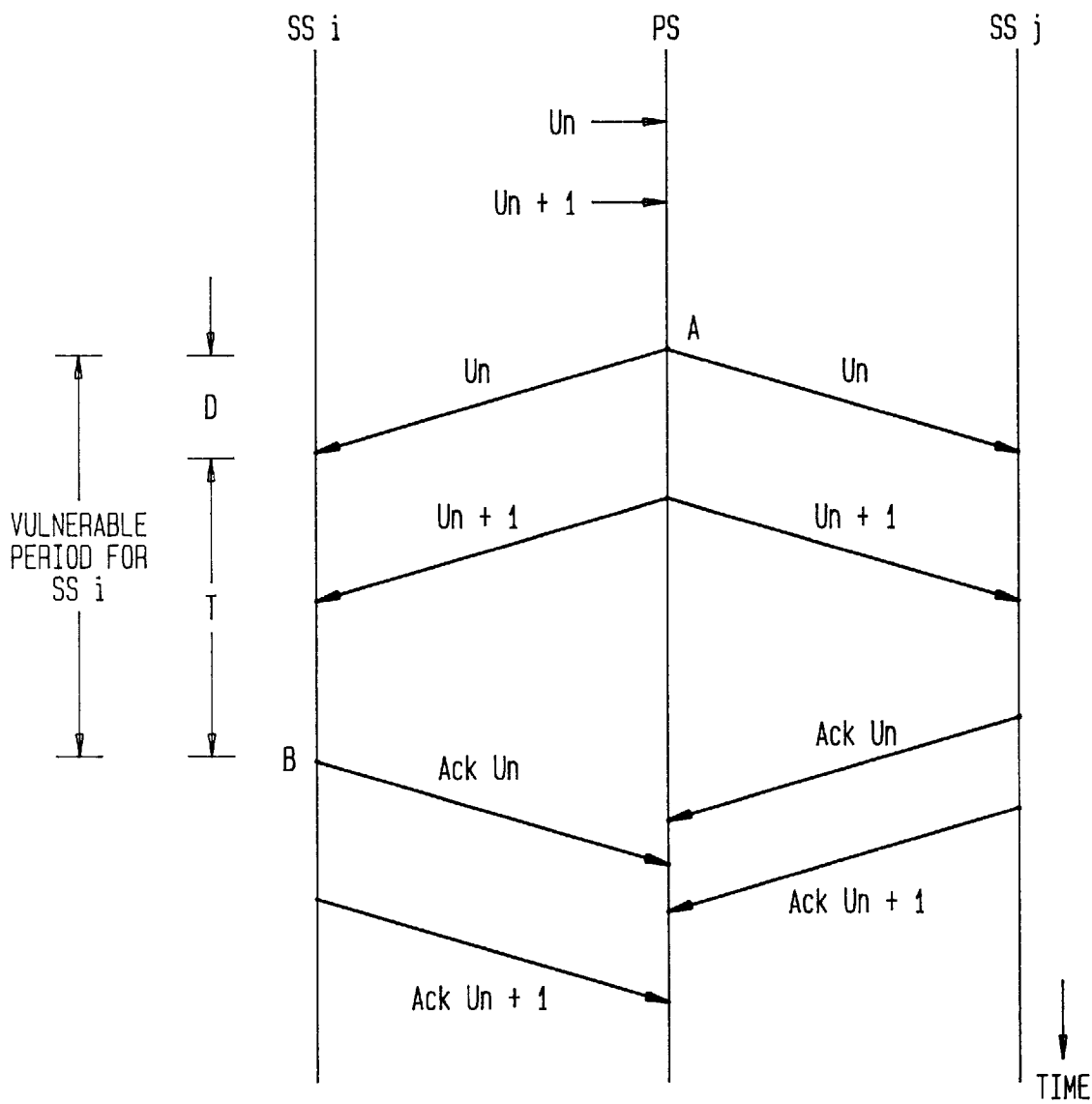
FIG. 2 is a timing diagram for the primary-writer protocol in accordance with the present invention.

As noted before, a record is first updated at its primary site under the method. A vulnerable period is defined for the record at a secondary site as the time interval from the completion of an update to the record at the primary site until the time when the update is posted at the secondary site (FIG. 2). As the most updated record has been available at the primary site at the start of the vulnerable period, queries accessing the record at the secondary site during the vulnerable period reference obsolete data, thus causing call misroutes. Certainly, such misroutes will not occur, should there be no record replication. FIG. 2 presents a timing diagram for the method of the invention. For example, the vulnerable period for update $U_n$ at the secondary site i is from time A to B.

The length of a vulnerable period mainly depends on two factors: 1) the network delay incurred by an update message sent from the primary site to the secondary site, and 2) the update response time (i.e., time from the arrival of an update until its processing is completed) at the secondary site. These factors in turn depend on the characteristics of the signaling network, the design of each database, the traffic load, the ratio of query and update rates, and the service scheduling discipline for query and update processing.

Based on a performance study with typical parameters in today's telecommunication networks, results in FIGS. 5–7 show that the fraction of calls misrouted under the method of this invention is satisfactorily small (e.g., less than $10^{-4}$) for a wide range of expected customer behavior (in term of call throughput and ratio of record read-write frequencies $R_q$) in the Personal Communication Networks (PCN), wireless networks, Universal Personal Telecommunication (UPT) services and other advanced services to be offered by the Intelligent Networks (IN).

Furthermore, when the method of this invention is compared with other concurrency control protocols such as the primary-site locking and the basic time stamp protocols, FIGS. 3 and 4 show that since the method of this invention avoids extensive message exchanges required by the existing protocols among database sites, it reduces the vulnerable periods, thus reducing the call misroutes.

Figure 11A:
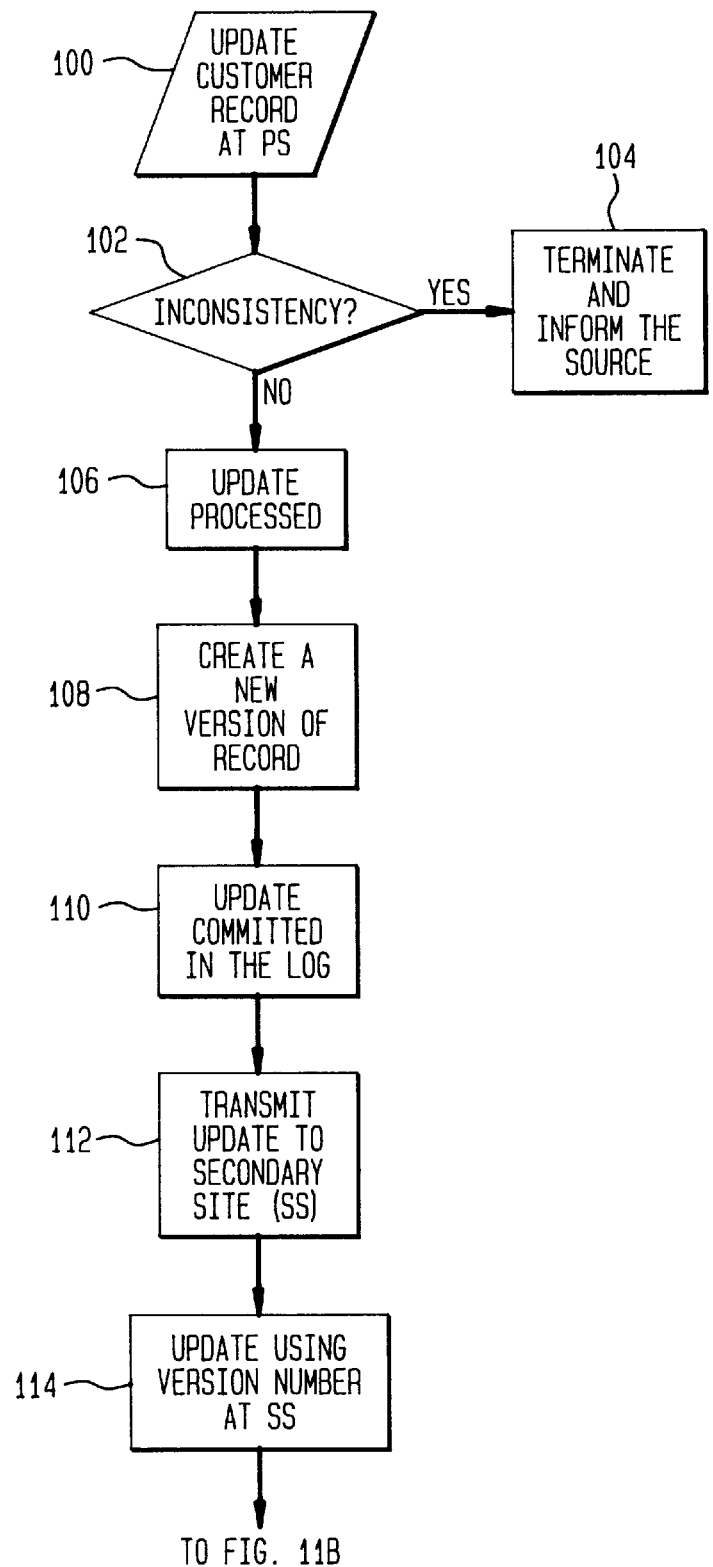
FIGS. 11A and 11B are flow charts showing the general method of the invention.
Figure 11B:
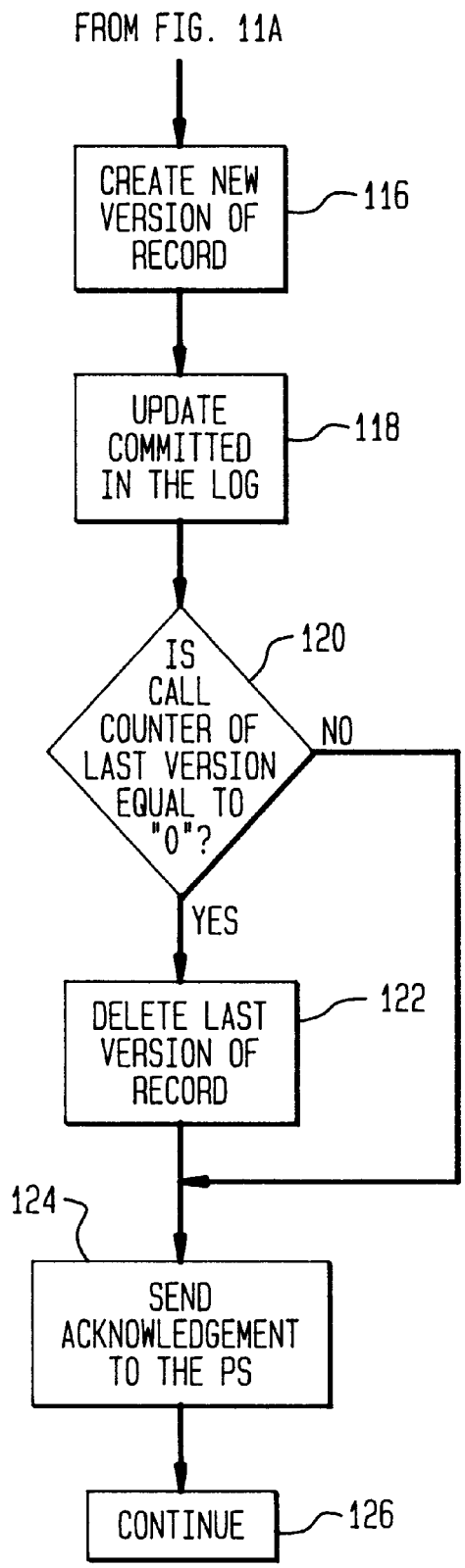

Referring now to FIGS. 11A and 11B, there is illustrated a high level flow chart depicting the method of the present invention using the primary writer protocol of the present invention.

As shown in block 100, the customer record at the primary site is first updated. The update is then checked for any data inconsistency in block 102. If there is an inconsistency, the update program is terminated in block 104. If there is no data inconsistency, the update is then processed in block 106 and a new version of the record is created in block 108. The updated is committed in the log in block 110. The information relating to the update is then transmitted to databases at secondary sites in block 112. The secondary site updates by using the version number in block 114. Secondary site then creates a new version of the record in block 116. The update is committed in the log at the secondary site in block 118. If the call counter of the last version of the record is zero in block 120, then the old database record is deleted in block 122. Regardless whether the call counter is zero or not, the secondary site sends an acknowledgement to the primary site as the update has been successfully processed in block 124. The process continues with the next update in block 126.

Replicated Database Design For Global Mobility

The protocol of the present invention is also adapted for use with a replicated database design for supporting global mobility with wired and wireless networks, or a combination thereof.

To support the service, personal, and terminal mobility, the communication network has to store, maintain and retrieve customers' mobility information for signaling purposes. This information includes that specified in the reference environment of a customer (e.g., the characteristics of the terminal in use, the services subscribed, the location data and the call routing logic). Thus, a key challenge for the mobility management is to develop an efficient database architecture so that the mobility data can be readily available for signaling functions such as call setup and routing.

The current approach to supporting the terminal mobility requires a home database (or Home Location Registers, HLR) and a visitor database (or Visitor Location Registers, VLR). This HLR-VLR architecture actually has been established as an industry standard in the Global System for Mobile Telecommunications (GSM) for Europe and the IS-41 recommendations for North America. The home database can accessed by the fixed, wired or wireless network, whereas the visitor database is connected to a switch (referred to as the mobile switching center, MSC) in the wireless network. The routing and other signaling functions of each call initiated from or destined for a mobile customer requires the use of the location information stored in the databases. The protocol and the associated architecture for supporting the terminal mobility are well defined, and understood by those skilled in the art.

The notion of personal and service mobility is relatively new. As a result, the protocols and the architecture for the personal and service mobility are yet to be standardized. The present invention is concerned with a signaling-network architecture based on replicated database for providing personal and service mobility to customers traveling throughout the world.

In the following description, two alternative database architectural designs are examined, which might be adopted for mobility management. Due to the unique characteristics of global mobility, an extended signaling network based on replicated databases to support global mobility is proposed. The applicability of the architecture to the personal and service mobility and its compatibility to the industrial standards for terminal mobility is set forth. The system performance and cost considerations for the proposed architecture are also discussed.

The system and method of the present invention can be applied to customer location information (i.e., routing data) of personal mobility. As explained below, the present invention can easily cover service mobility and reference environments, such as Universal Personal Telecommunications (UPT) services. In order for the IN to support the services, it has to rely on the extensive use of databases for call routing and other signaling functions. Each of the originating and receiving ends of a UPT call can be a wireless or wired terminal.

Figure 8:
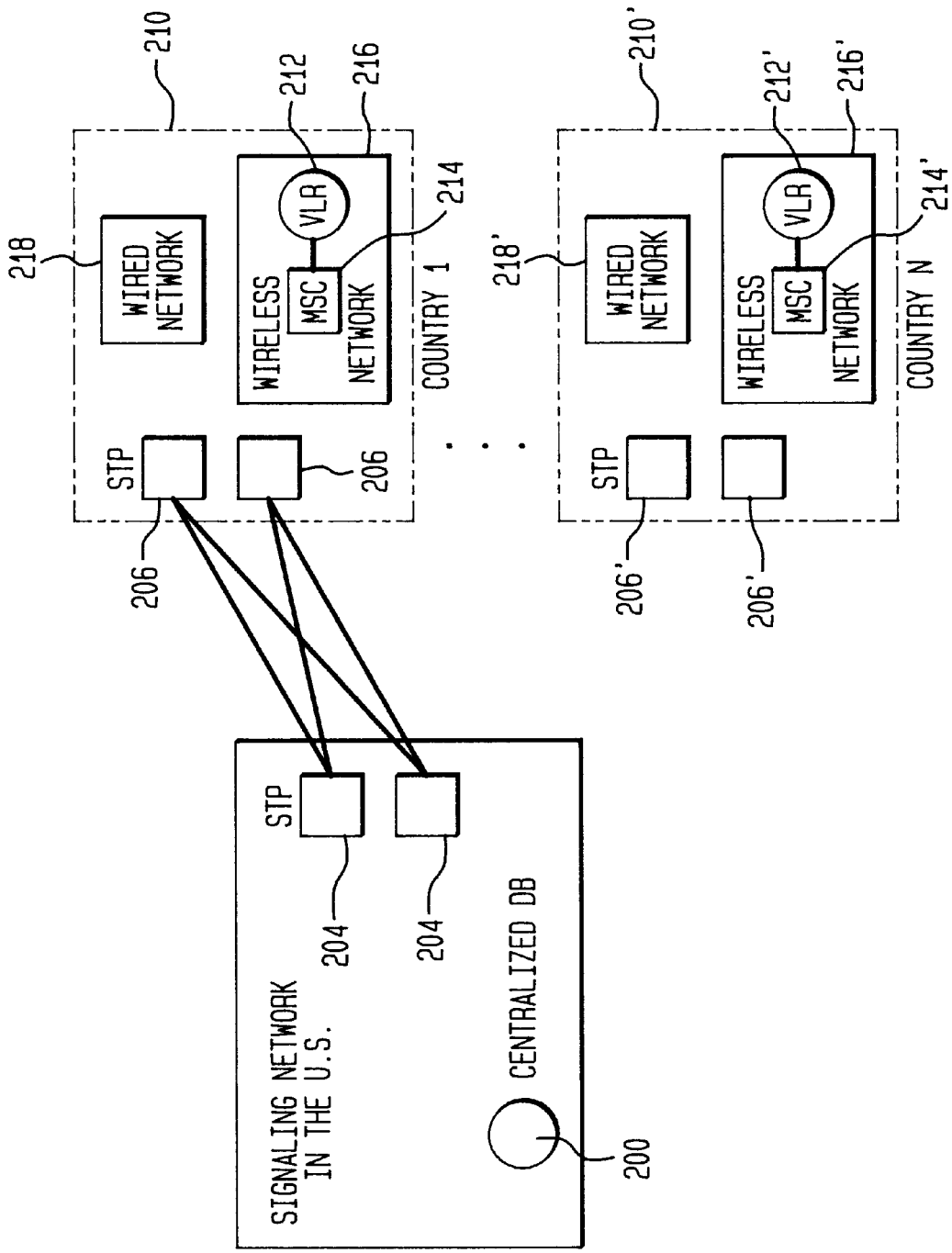
FIG. 8 is a block diagram showing a centralized database for global mobility using the protocol in accordance with the present invention.

An example of an existing database architectural design to support the UPT services for customers traveling abroad is shown in FIG. 8. The customer location information is stored in a centralized database 200 physically located in the U.S. (also referred to as the home country) In order to make this design feasible, it requires:

1. Customers traveling abroad have to register from the visited country so that the network is informed of their current locations (e.g., in terms of POTS numbers in wired networks, or mobile station roaming numbers in wireless networks). This location information for all customers subscribing to the UPT services is stored in the centralized database, which can be supported by a Network Control Point, NCP. Signal transfer points 204 in the U.S. network communicate with signal transfer points 206 is country 1, and any other country in 210.

Country 1 includes a VLR 212 connected to a MSC 214 in the wireless network 216. Country 1 also includes a wired network 218. Country n also includes similar elements referenced by prime notation.

2. Every time a customer changes location, the location data (e.g., a POTS number in a wired network, or a pointer in the HLR pointing to the VLR 212 serving the location area, a group of cells, where the user is located in a wireless network 216) for the customer in the database is updated. Such database updates can be initiated:
   a) explicitly by customers connected to a wired network, as similar to the current 500 services, or
   b) automatically by the wireless network at which the customers are located.
3. When a call is destined for a UPT customer located either in the U.S. or abroad, the signaling network queries the centralized database 200 for the location information for call setup and other signaling functions.

Figure 9:
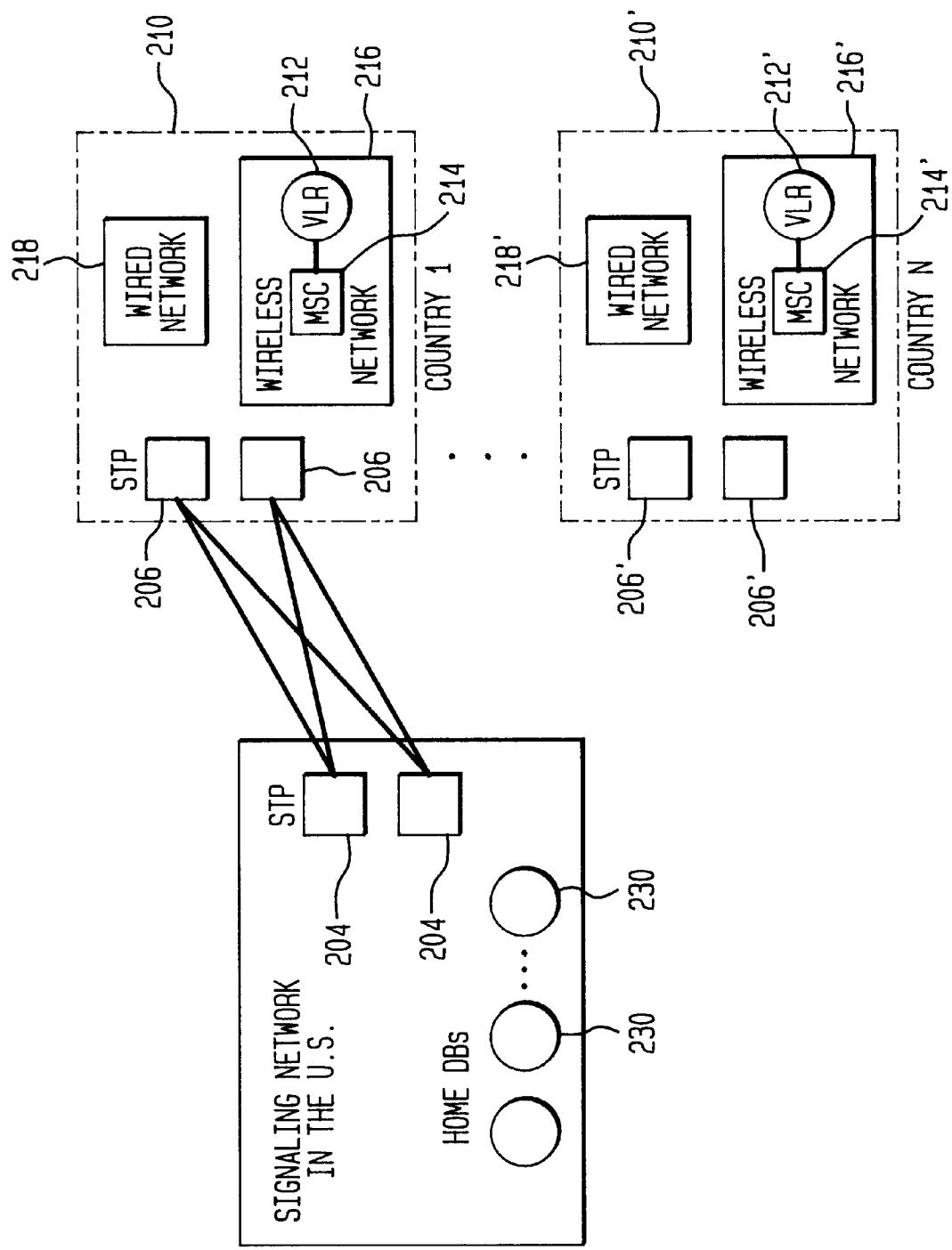
FIG. 9 is a block diagram showing the use of distributed, home databases for global mobility.

The signaling network using distributed databases for mobility management is shown in FIG. 9. In the description that follows, elements common to those described in FIG. 8 are given the same reference numerals. In this distributed database design, customer records are partitioned and stored (but not replicated) at different physical locations, which can be interpreted as the customers' home locations 230. For this reason, the distributed database design is also referred to as the home database design. Actually, the centralized database design can be viewed as a special case of the distributed design where all data is placed at a single location. On the other hand, the distributed databases offer potential advantages over the centralized design such as improved availability, reliability, and the flexibility of load balancing.

This distributed database design can be used extensively for many services, e.g., Advanced 800 and Software Defined Network (SDN) services, where customer data for the same service is distributed and stored at multiple NCP databases. Although each customer's record is stored at a primary and a secondary NCP for reliability reasons, only the primary copy is used for signaling functions at normal conditions and the secondary copy is treated only as a backup in case of failures. Thus the systems in use should be classified as the distributed design.

The major motivation for such wide use of distributed databases is to overcome the limitation of the processing power and memory constraint of each NCP. A single or at most a few databases (i.e., NCPs) are needed at the initial deployment of a new service. As the service demand grows, additional databases are necessary, thus making the centralized database design evolve into the distributed design. The assumptions and operations for call setup, routing and other functions for the distributed database design are identical to those for the centralized database design, as discussed above. For a given customer, the signaling networks or switches have the computational logic to determine which database among many contains the signaling data for the customer.

Because a current signaling network provides a very high degree of connectivity, querying the distributed databases across the U.S. does not cause unacceptable delays nor incur high costs for call setup and other signaling functions. The use of distributed databases will continue to be a viable approach. If the high connectivity is maintained in the future, there will not be a need to replicate customer records at multiple places for reducing query delays and associated costs. However, this is not the case for signaling in other global areas, as anticipated for supporting global mobility in the future. In that situation, replicating customer records at a visitor database located at foreign countries will lower operating costs and shorten querying delays, as explained below.

Figure 10:
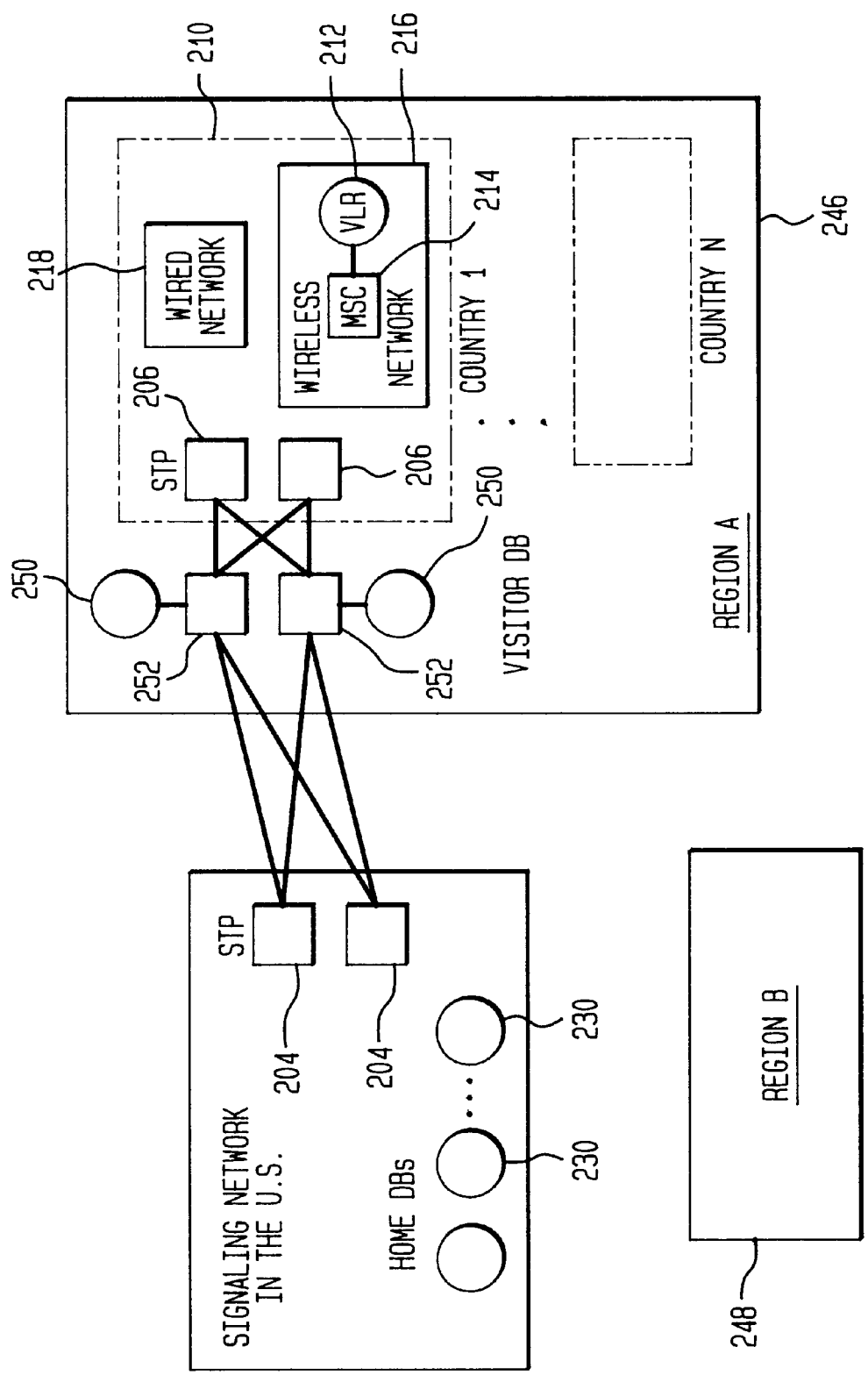
FIG. 10 is a block diagram showing an extended signaling network with replicated databases for global mobility.

A signaling network based on replicated databases is shown in FIG. 10, which illustrates basic use of the replicated database of the present invention for use in global mobility. Like reference numerals are used for elements common to other units of FIGS. 8 and 9.

1. Depending on the anticipated traffic load and other engineering considerations, the world (besides the U.S.) is divided into several regions, each of which covers a number of foreign countries, such as the illustrated Region A 246 and Region B 248.
2. A pair of visitor databases 250 are installed physically in each region, and connected to the signaling network in the U.S. i.e., the home country ,for example, via two additional STPs 252 physically located in that region. The number of STPs installed in a region and the number of signaling links connecting the STPs to the U.S. signaling network can be adjusted and determined according to the traffic, performance, and reliability requirements.
3. In the registration process of a customer visiting a foreign country, a record of location and other related signaling information for the customer is set up in the visitor database 250 for the region. This new information will also be sent back to update the associate home database 230 in the U.S. As a result, each roaming customer has two replicated copies of signaling data: one in the home database in the U.S. and the other in the visitor database physically located at or close to the visited country. The record in the visitor database will be removed when the customer leaves the region.

The replicated database can be accessed for call setup and other signaling purposes. For call originating from the visited country or region and destined for the roaming customers, queries can be launched to the visitor database. Calls initiated in the U.S. will query the home database. There are three major advantages for the use of replicated databases:

1. Substantial Cost Saving
   Due to local availability of needed customer data, the transmission cost for signaling messages for calls originated from the visited country or region can be saved. The saving will be substantial for: a) customers roaming half way around the world, b) calls requiring multiple queries into the database, which will likely be the case for advanced services in the future, and c) a majority of calls which originate from the visited country or region, which will also be the case for some business customers. Furthermore, as the number of messages sent over a long distance is decreased, the facility cost can also be reduced as fewer transmission facilities (e.g., signaling links) will be needed to support the same amount of call traffic.
2. Enhanced Delay Performance
   Call setup time and response times for other signaling functions can be reduced.
3. Compatibility with Existing Wireless Standards
   The replicated database design is compatible with the industry standards such as the IS-41 and the GSM specifications for wireless networks. The visitor database in a region can be treated as the HLR by the wireless network in the visited country. The rest of the standardized protocols for wireless networks remain applicable. Upon receiving updates from a local wireless network, the visitor database is responsible for forwarding the updates to the home database in the U.S. to ensure customer data consistency in the home and visitor databases. Hence, the replicated database design indeed applies not only to wired services but also to wireless services.

In accordance with the present invention consistency must be maintained between the replicated copies of customer data stored in the home and visitor databases. The system and method of the present invention using the Primary-Writer Protocol (PWP) can be applied to the home and visitor databases for global mobility. The Primary-Writer Protocol of the present invention is advantageous because telecommunication applications can tolerate inconsistency between replicated records for a short period of time. As noted above, the main consequence of accessing obsolete data is a call misroute. The performance analysis of the Primary Writer Protocol of the present invention establishes that the misroute probability under the present invention is small for the expected customer behavior in wireless networks and IN. The present invention preserves both the internal and mutual data consistency, and also allows the system to recover from certain types of failures. The main advantage of the Primary Writer Protocol is its low overhead, especially when compared with existing protocols for computer systems (e.g., banking systems), which are intended for maintaining stronger data consistency at all times.

Using the Primary Writer Protocol of the present invention to support global mobility, the visitor database and the home database is designated as the Primary Site and Secondary Site, respectively for updating purposes. As noted above, this arrangement is appropriate because location updates and other changes of signaling information are most likely generated from customers, who are roaming in the foreign countries.

Although the above discussion focuses on the location information for UPT customers, it should be noted that the replicated database design actually applies well to service mobility and reference environments. The location information, the services subscribed, and the reference environment are specified on a per customer basis. Thus, the replicated database design and the associated protocols can treat the per customer information related to the subscribed services and other data items included in the reference environment, in the same way as the location information. As far as the system performance of the replicated database design is concerned, the only difference among various data items will be their query-to-update ratios (e.g., the ratio of the querying rate to the location update rate for a UPT customer).

Nevertheless, it is expected that the most frequently updated data item will probably be the location information for a mobile customer; the query-to-update ratios for other signaling data items will be higher than that for location data. As a result, the update algorithm of the present invention will also apply to customer records containing subscribed services, reference environment and other signaling information.

A factor that may degrade the performance of the replicated design is the query-to-update ratio. If the ratio is high (i.e., the customer information is seldom changed), the overhead in updating the replicated records will be minimal. Otherwise (e.g., for a mobile customer moving from location to location), the update overhead can be significant. The following strategy will enhance the performance of the replicated design, in such situations.

A mobile, wireless customer is roaming in a foreign country. As a customer moves from one location area to another, the customer location information in the visitor database is updated frequently. The corresponding customer record in the home database is also updated. Thus, the transmission and processing costs for maintaining the current location information in the home database will be significant, especially if the customer is located far away from the U.S. The situation will become even worse if the customer moves from location to location without making or receiving calls; i.e., no revenue is received to cover the cost incurred in handling the database updates.

One way to reduce the overhead for location updates is to maintain the current location information for certain highly mobile customers only in the visitor database. The home database, in contrast, contains an identifier pointing to the visitor database on which the current location information is stored. (i.e., the visitor database had the complete record of information associated with this roaming customer, and the home database has only partial customer information.)

As a result, the home database does not need to update the location information every time a customers changes its location overseas. Furthermore, calls originated from the U.S., destined for a customer traveling overseas first retrieves the identifier from the home database and then accesses the current location information in the visitor database for call setup and other signaling functions.

The enhancement approach for keeping complete customer data only in the visitor database not only applies to the location information, but also applies to other data items with frequent updates. In addition, the enhancement approach should be used on a per customer basis because different customers have different mobility and calling patterns. As discussed above, the key parameters for identifying these customers for whom the enhancement scheme may apply include:

1. The ratio of calls to the customer originated from the visited region to all calls destined for that customer,
2. The database query-to-update ratio (e.g., an indication of mobility), and
3. The ratio of cost for updating the home database (with update requests sent from the visited region) and that for remote querying the visitor database for calls originated from the U.S.

Based on these parameters of each traveling customer, the signaling network can determine whether the enhancement approach should be applied to the customer (i.e., only the visitor database contains the customer's full record and the home database stores only parts of the customer data, which are less frequently updated). In fact, the approach can be applied to a customer dynamically on a regular basis, i.e, the network can turn on or off the approach periodically (e.g., every night) for a traveling customer, depending on the customer's call throughput and update frequency statistics during the previous period.

In accordance with the present invention, the extended signaling network based on replicated database has many benefits and can be viewed as a means to globalize the telephone network without actually building transport networks in foreign countries, which the telephone companies in the United States often are not allowed or prefer not to do. Yet, the replicated database design in effect makes use of foreign networks to support global mobility for network customers.

The replicated design costs less to implement than other system methods such as the employment of satellites for locating mobile customers throughout the world (i.e., global, terminal mobility). More importantly, the system of the present invention is based on the current infrastructure of wired and wireless networks, and it conforms with existing standards of cellular networks. Thus, the replicated design not only reduces the operating costs and calls setup delay when compared with other alterative database designs, but also enables the United States telephone network to offer global mobility services to customers sooner.

The proposed design can also help the U.S. network compete with some foreign telephone companies. The network may choose to allow access to the visitor database only by (wired and wireless) networks of existing business partners; competitors' networks will not be provided with the signaling information stored and used in the visitor database. As a result, for calls originated in a foreign country and destined for a network roaming customer, only networks of the company in question are equipped to carry the calls. Such an arrangement can also be used to enhance the U.S. network's position in partnering with service providers overseas. In another business arrangement, the telephone network may also choose to furnish, for a fee, some foreign carriers with certain signaling information to carry calls destined for the network customers traveling in the country. Furthermore, if the telephone network can work with its business partners abroad, the replicated database design can be implemented in an alternative way.

If an arrangement between the telephone network and its business partner overseas can be made, instead of installing network visitor database and STPs in a foreign country, records of network customers traveling in the country can be downloaded directly from the home database to a database in the partner's network. Consequently, as in the original replicated database design, each traveling customer continues to have two copies of his or her information for signaling purposes. The protocols and operations for the replicated design remain applicable to this new setting, although a United States telecommunications network does not physically own visitor databases and STPs in that country.

It is to be understood that the above description is only one preferred embodiment of the invention. Numerous other arrangements may be devised by one skilled in the art without departing from the spirit and scope of the invention.

That which is claimed is:

1. A method for updating a replicated database in a foreign telecommunication network system situated in a foreign region and a home country telecommunication network system situated in a home country so as to improve call setup time and system availability in a foreign region for customers roaming outside of their home country comprising the steps of updating a customer database record in a visitor database contained in a foreign region within a signaling system of a foreign telecommunication network situated in the foreign region, wherein the foreign telecommunication network includes a call transport system with switches for forwarding calls from a local foreign station through the call transport system to a destination, transmitting information concerning the updated database record from the visitor database through a signaling system of a home telecommunication network to a home database located in the home country which contains a replicated version of the database record in the visitor database, adding a field to the database record corresponding to a version number of the database record so as to identify the version of the database record referred by queries of calls in progress, changing the home database record to reflect changes in the visitor database by using the version number sequence, while maintaining at all database sites an older version of the database record for query access until after completing the processing of all previous calls querying the older version of the database record, and directing the query to the home database for accessing the customer database record if the customer is not roaming in a foreign region.

2. The method according to claim 1 including launching queries to the home database when calls are originated from the home country to a customer in the foreign region.

3. The method according to claim 1 including launching queries to the visitor database when calls are originated from the foreign region to a customer.

4. The method according to claim 1 including the step of removing the customer database record from the visitor database when the associated customer leaves the foreign region.

5. The method according to claim 1 including committing the updated database record of the visitor and home databases by recording a record of update activity in a log in a stable data storage area after the updated database record has been processed and committed at the visitor and home databases respectively.

6. The method according to claim 1 including sending an acknowledgement from the home database to the visitor database when an updated database record has been processed within the home database.

7. The method according to claim 1 including the step of maintaining current location information in the visitor database for highly mobile customers traveling in the foreign region and maintaining an identifier in the home database directing calls to the visitor database for queries.

8. The method according to claim 1 including the step of maintaining the identifier in the home database directing the calls to the visitor database for queries on a per customer basis.

9. The method according to claim 1 including maintaining multiple versions of the database records in the home and visitor databases so that queries for a call can access the same version of the database record in the same database for consistent routing and signaling information.

10. The method according to claim 1 including deleting the older version of the database record at all database sites after completing the processing of all calls querying the older version of the database record.

11. The method according to claim 1 including adding a call counter field to the database record to indicate the number of ongoing calls whose queries have previously accessed that version of the database record.

12. The method according to claim 11 including incrementing the value in the call counter field by one if a new call references to it, and decrementing the value in the call counter field by one when a call setup is completed.

13. The method according to claim 12 including deleting the older version of the database record when the value in the call counter field is zero.

14. The method according to claim 1 including the step of verifying the updated database record in the visitor database for data consistency.

15. The method according to claim 1 wherein the call transport system of the foreign region includes a wireless phone network and a wired phone network.

16. A system for updating a replicated database in a foreign telecommunication network system situated in a foreign region and a home country telecommunication network system situated in a home country so as to improve call setup time and system availability in a foreign region for customers roaming outside their home country comprising

- a foreign telecommunication system situated in a foreign region and having a call transport system and switches for forwarding calls from a telecommunication station through the call transport system to a destination,
- a signaling system operatively connected to the foreign call transport system, and including a visitor database within the signaling system containing customer database records for call routing and other signaling functions,
- a home telecommunication system having a home signaling system and a home database, said visitor database being connected to said home signaling system,
- means for updating a customer database record in the visitor database,
- means for transmitting information concerning the updated database record through the home signaling network to the home database containing an older version of the database record,
- means responsive to the completion of all calls querying the older version of both the visitor and home database record for deleting the older version of the database record, and
- wherein each updated record includes a call counter field for indicating the number of ongoing calls whose queries have previously accessed that version of the database record.

17. The system according to claim 16 including means for launching queries to the home database when calls are originated from the home country to a customer in the foreign region.

18. The system according to claim 16 including means for launching queries to the visitor database when calls are originated from the foreign region to a customer.

19. The system according to claim 16 including means for maintaining current location information in the visitor database for highly mobile customers traveling in the foreign region, and an identifier contained within the home database directing calls to the visitor database for queries.

20. The system according to claim 16 including storage means for recording updated record activity at the visitor and home databases after the updated database record has been processed and committed at the visitor and home databases respectively.

21. The system according to claim 16 including means for sending an acknowledgement from the home database to the visitor database after an updated database record has been processed within the home database.

22. The system according to claim 16 including means for maintaining multiple versions of database records in the visitor and home databases so that queries for a call can access the same version of the database record in the same database for consistent routing and signaling information.

23. The system according to claim 16 wherein each updated database record includes an identifying field corresponding to a version number of the database record so as to identify the database record referenced by queries of calls in progress.

24. The system according to claim 23 including means for updating the database records in the home database by the version number sequence of the updated database records.

25. The system according to claim 16 including means for incrementing the value in the call counter field by one if a new call references to it, and means for decrementing the value in the call counter field by one when a call setup is completed.

26. The system according to claim 25 including means for deleting the older version of the database record when the value in the call counter field is zero.

27. The system according to claim 16 wherein said call transport system of the foreign region includes a wireless phone network and a wired phone network.

* * * * *